(12) United States Patent
Yoshida et al.

(10) Patent No.: US 11,230,126 B2
(45) Date of Patent: Jan. 25, 2022

(54) IMAGE FORMING APPARATUS

(71) Applicant: KYOCERA Document Solutions Inc., Osaka (JP)

(72) Inventors: Takeshi Yoshida, Osaka (JP); Yasuhiro Miyake, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 396 days.

(21) Appl. No.: 16/516,178

(22) Filed: Jul. 18, 2019

(65) Prior Publication Data
US 2020/0031149 A1    Jan. 30, 2020

(30) Foreign Application Priority Data
Jul. 25, 2018   (JP) ............................. JP2018-139443

(51) Int. Cl.
| B41F 5/00 | (2006.01) |
| B41F 7/00 | (2006.01) |
| B41F 9/00 | (2006.01) |
| B41F 11/00 | (2006.01) |
| B41F 1/22 | (2006.01) |
| B41J 27/12 | (2006.01) |
| H04N 1/00 | (2006.01) |
| G03G 15/00 | (2006.01) |

(52) U.S. Cl.
CPC .......... B41J 27/12 (2013.01); H04N 1/00469 (2013.01); H04N 1/00602 (2013.01); G03G 15/50 (2013.01)

(58) Field of Classification Search
CPC . B41J 27/12; H04N 1/00469; H04N 1/00602; G03G 15/50
See application file for complete search history.

(56) References Cited

U.S. PATENT DOCUMENTS

| 9,663,317 | B2 | 5/2017 | Wada | |
| 2015/0353314 | A1* | 12/2015 | Wada | B65H 31/02 271/176 |
| 2017/0129732 | A1* | 5/2017 | Onishi | G03G 15/6529 |

FOREIGN PATENT DOCUMENTS

| CN | 105278277 A | 1/2016 |
| JP | 2006-282397 A | 10/2006 |
| JP | 2017-081686 A | 5/2017 |

OTHER PUBLICATIONS

An Office Action mailed by China National Intellectual Property Administration dated Sep. 22, 2020, which corresponds to Chinese Patent Application No. 201910654430.8 and is related to U.S. Appl. No. 16/516,178 with English language translation.

* cited by examiner

*Primary Examiner* — Moustapha Diaby
(74) *Attorney, Agent, or Firm* — Studebaker & Brackett PC (57) ABSTRACT

An image forming apparatus includes a discharge rollers pair, a sheet pressing member and a discharge tray. The sheet pressing member includes a first rotational shaft, a detection piece and a corrugation piece. The corrugation piece protrudes in a radial direction different from a protruding direction of the detection piece from the first rotational shaft. When the detection piece is turned at a first angle into a first posture, the corrugation piece is changed into a contact posture where the corrugation piece comes into contact with the sheet to apply stiffness on the sheet. When the detection piece is turned at a second angle into a second posture, the corrugation piece is changed into a retracting posture where the corrugation piece separates from the sheet.

10 Claims, 8 Drawing Sheets

IMAGE FORMING APPARATUS

INCORPORATION BY REFERENCE

This application is based on and claims the benefit of priority from Japanese patent application No. 2018-139443 filed on Jul. 25, 2018, which is incorporated by reference in its entirety.

BACKGROUND

The present disclosure relates to an image forming apparatus including a sheet discharging device configured to discharge a sheet on which an image is formed.

A sheet discharging device of an image forming apparatus is frequently provided with a corrugation piece which applies stiffness on a sheet during the sheet discharging in order to prevent the discharged sheet from being displaced. On the other hand, in a case where the sheet is switched back for duplex printing, if the sheet is applied with stiffness by the corrugation piece, an abnormal sound sometimes occurs when the sheet is conveyed along an inversion path.

Then, the corrugation piece is sometimes configured to be switchable into a corrugation applicable state and a corrugation non-applicable state. Alternatively, a sheet detecting device for detecting a height of sheets stacked on a discharge tray is sometimes provided with a corrugation part (the corrugation piece).

However, the former case requires a drive source (for example, a solenoid) for switching the corrugation piece into the corrugation applicable state and the corrugation non-applicable state. The later case has no measure for the abnormal sound when the sheet is switched back.

SUMMARY

In accordance with an aspect of the present disclosure, an image forming apparatus includes a discharge rollers pair, a sheet pressing member and a discharge tray. The discharge rollers pair is configured to discharge and switch back a sheet at a discharge port. The sheet pressing member is configured to press an upper face of the sheet discharged by the discharge rollers pair. On the discharge tray, the sheet discharged through the discharge port is stacked. The sheet pressing member includes a first rotational shaft, a detection piece and a corrugation applying piece. The first rotational shaft is supported above the discharge port along a width direction perpendicular to a discharge direction. The detection piece protrudes in a radial direction from the first rotational shaft and supported in an initial posture where the detection piece protrudes toward the discharge tray across the discharge port. The detection piece is turnable into a first posture where the detection piece is pushed up by the sheet discharged at a predetermined discharge angle and then turned at a first angle with respect to the initial state and into a second posture where the detection piece is pushed up by the sheet switched back at a predetermined inversion angle and then turned at a second angle different from the first angle with respect to the initial state. The corrugation applying piece protrudes in a radial direction different from a protruding direction of the detection piece from the first rotational shaft, is rotatable together with the detection piece and is configured to come into contact with the discharged sheet from an upper side to apply stiffness to the sheet. When the detection piece is turned at the first posture, the corrugation applying piece is changed into a contact posture where the corrugation applying piece comes into contact with the sheet to apply stiffness on the sheet. When the detection piece is turned at the second posture, the corrugation piece is changed into a retracting posture where the corrugation piece separates from the sheet.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, an image forming apparatus according to an embodiment of the present disclosure will be described with reference to the drawings.

Figure 1:
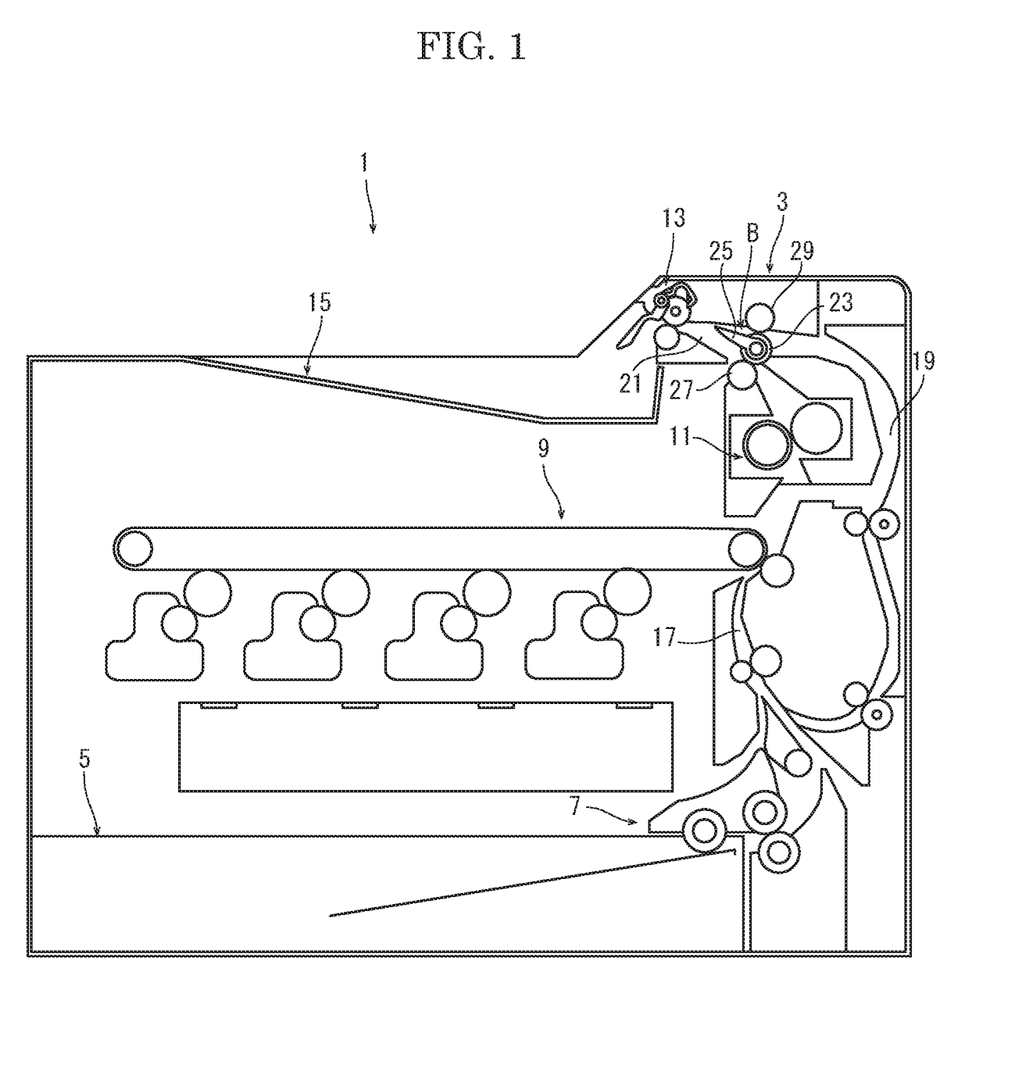
FIG. 1 is a front view schematically showing a color printer according to an embodiment of the present disclosure.

First, with reference to FIG. 1, an entire structure of a color printer 1 as an image forming apparatus will be described. FIG. 1 is a front view schematically showing the color printer 1. In the following description, a near side (a front side) of a paper surface of FIG. 1 is defined to be a front side of the color printer 1, and a left-and-right direction is defined based on a direction in which the color printer 1 is viewed from the front side. In each figure, Fr and Rr respectively show a front side and a rear side of the color printer 1.

An apparatus main body 2 of the color printer 1 is provided with a sheet feeding cassette 5 in which a sheet is stored, a sheet feeding device 7 configured to feed the sheet from the sheet feeding cassette 5, an image forming part 9 configured to form a full color toner image on the fed sheet, a fixing device 11 configured to fix the toner image on the sheet, a sheet discharging device 13 configured to discharge the sheet on which the toner image is fixed and an discharge tray 15 on which the discharged sheet is stacked.

In the apparatus main body 2, a one-side printing path 17, a double-side printing path 19 and a common path 21 are formed. The one-side printing path 17 is formed so as to extend from the sheet feeding device 7 through the image forming part 9 to a branch part B at the downstream side of the fixing device 11. The double-side printing path 19 is formed so as to branch from the one-side printing path 17 at the branch part B and join to the one-side printing path 17 between the sheet feeding device 7 and the image forming part 9. The common path 21 is formed between the branch part B and the sheet discharging device 13.

At the branch part B, an intermediate roller 23 and a branch guide 25 are provided. The branch guide 25 is supported by a rotational shaft of the intermediate roller 23 in a turnable manner. With the intermediate roller 23, a one-side side conveyance roller 27 comes into contact from the side of the one-side printing path 17 to form a nip between the rollers. Furthermore, with the intermediate roller 23, a double-side side conveyance roller 29 comes into contact from the side of the double-side printing path 19 to form a nip between the rollers. When the branch guide 25 is turned upward, the one-side printing path 17 is communicated with the common path 21. When the branch guide 25 is turned downward, the double-side printing path 19 is communicated with the common path 21.

Next, an image forming operation will be described. In a case of a one-side printing operation, the branch guide 25 is turned upward, and the one-side printing path 17 is communicated with the common path 21. The sheet is fed from the sheet feeding cassette 5 by the sheet feeding device 7 to the one-side printing path 17. After the toner image is transferred on the sheet at the image forming part 9, the toner image is fixed on the sheet by the fixing device 9. Then, the sheet is conveyed along the common path 21, discharged by the sheet discharging device 13 and then stacked on the discharge tray 15.

In a case of a double-side printing operation, the branch guide 25 is turned upward, and the one-side printing path 17 is communicated with the common path 21. The sheet is fed from the sheet feeding cassette 5 by the sheet feeding device 7 to the one-side printing path 17. After the toner image is transferred on one face of the sheet at the image forming part 9, the toner image is fixed on the sheet by the fixing device 9. Then, the sheet is conveyed along the common path 21 and then discharged above the discharge tray 15. After the rear end of the sheet is passed through the nip between the intermediate roller 23 and the one-side side conveyance roller 27, the branch guide 25 is turned downward, and the common path 21 is communicated with the double-side printing path 19. The sheet is switched back by the sheet discharging device 13, and conveyed to the double-side printing path 19 through the common path 21. Then, the sheet is conveyed along the double-side printing path 19 and then the one-side printing path 17. At the image forming part 9, the toner image is transferred on the other face of the sheet and then fixed on the sheet by the fixing device 11. After that, the branch guide 25 is turned upward, the one-side printing path 17 is communicated with the common path 21. Then, the sheet is conveyed along the common path 21 and then discharged by the sheet discharging device 13. The discharged sheet is stacked on the discharge tray 15.

Figure 2:
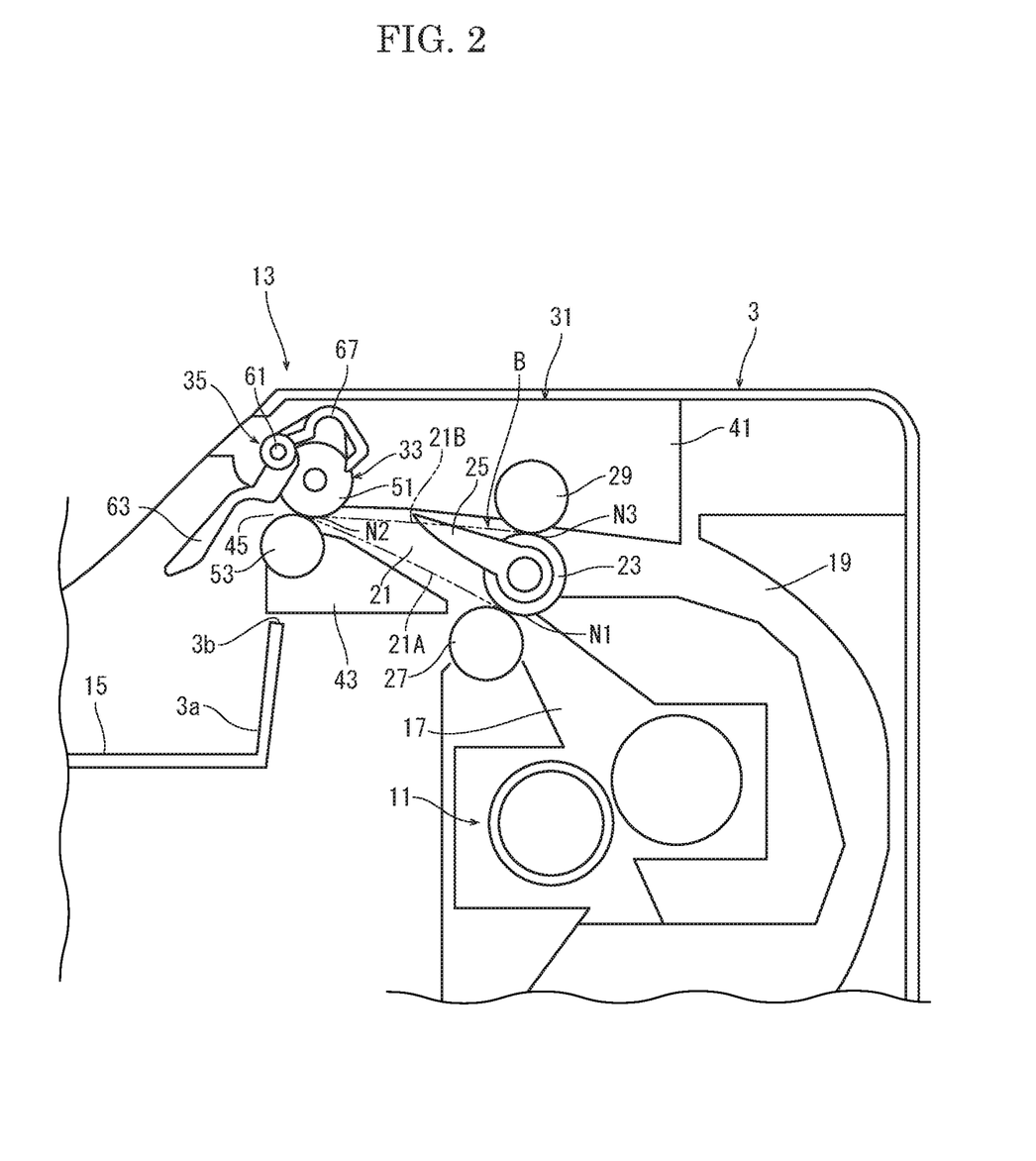
FIG. 2 is a side view showing a sheet discharging device and its periphery, in the color printer according to the embodiment of the present disclosure.

Next, with reference to FIG. 2 and FIG. 3, the sheet discharging device 13 and its periphery will be described. FIG. 2 is a cross sectional view showing the sheet discharging device and its periphery and FIG. 3 is a disassembled view showing the sheet discharging device.

As shown in FIG. 2, on an upper face of the apparatus main body 3, a rear wall 3a inclined at a slightly obtuse angle with respect to a horizontal plane is formed. At an upper end portion of the rear wall 3a, an opening 3b is formed along a sheet width direction W perpendicular to the sheet discharge direction. The discharge tray 15 is integrally formed with a lower end of the rear wall 3a so as to extend in the sheet discharge direction.

Figure 3:
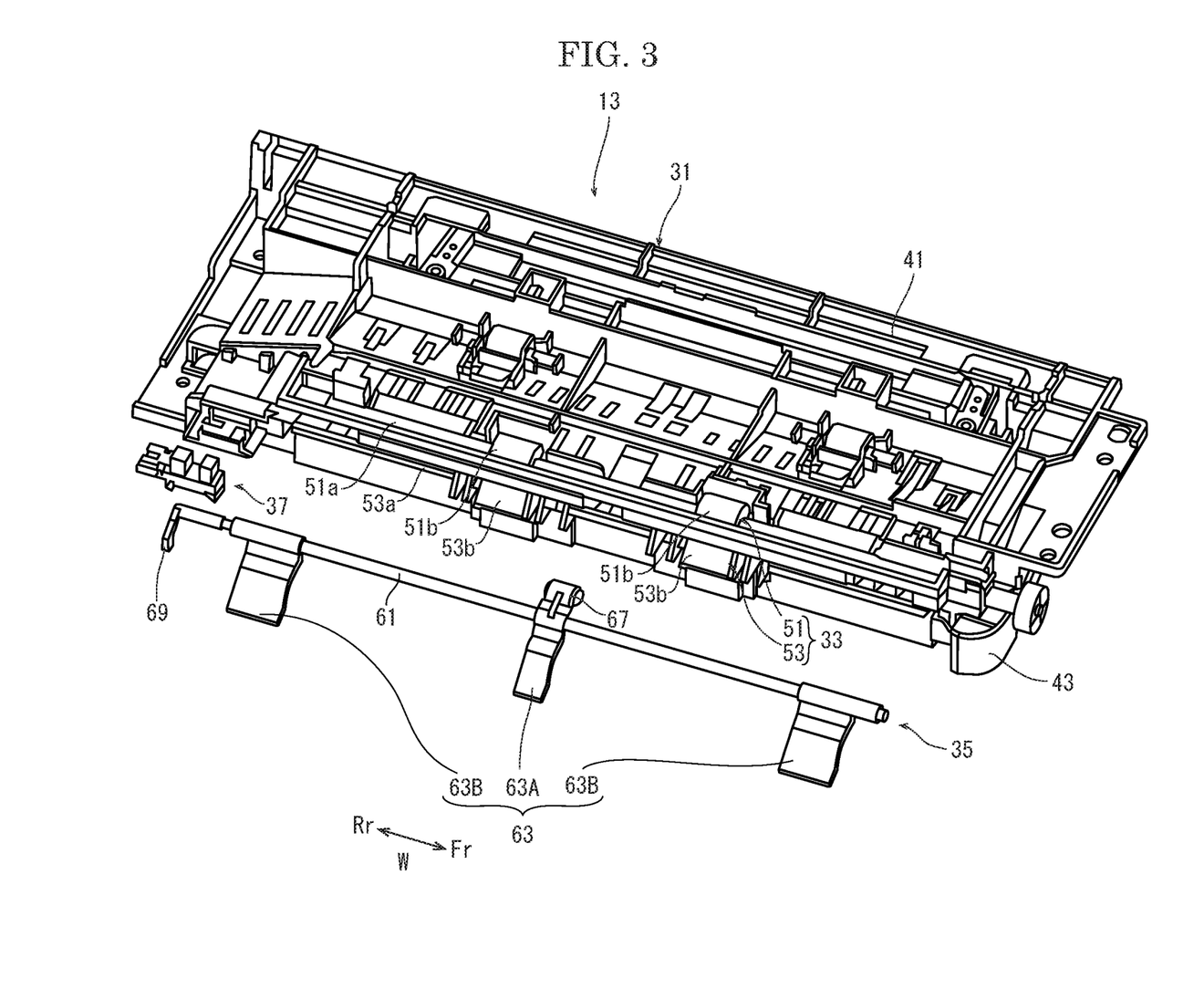
FIG. 3 is a disassembled perspective view showing the sheet discharging device, in the color printer according to the embodiment of the present disclosure.

As shown in FIG. 2 and FIG. 3, the sheet discharging device 13 includes a casing 31, a discharge rollers pair 33 and a sheet pressing member 35 and an upper limit detection sensor 37 (refer to FIG. 3) which are stored in the casing 31.

The casing 31 is formed by a pair of upper frame 41 and a lower frame 43, and fixed to the rear wall 3a so as to close the opening 3b. Between the upper frame 41 and the lower frame 43, the common path 21 is formed. The common path 21 is formed such that its height is gradually lowered from the side of the branch part B toward the side of a discharge port 45.

As shown in FIG. 3, the discharge rollers pair 33 includes a drive roller 51 and a driven roller 53. The drive roller 51 has a second rotational shaft 51a and a plurality of roller bodies 51b (two roller bodies in the embodiment) fixed to the second rotational shat 51a at predetermined intervals. The second rotational shaft 51a is disposed along an upper edge of the discharge port 45 and the two roller bodies 51b are disposed at both sides of a center in the sheet width direction W. Both end portions of the second rotational shaft 51a are supported by the upper frame 41 in a rotatable manner. To the one end portion of the second rotational shaft 51a, a drive source (not shown) is connected. The second rotational shaft 51a is driven by the drive source to be rotated in both directions.

The driven roller 53 has a third rotational shaft 53a and two roller bodies 53b fixed to the third rotational shat 53a at predetermined intervals. The third rotational shaft 53a is disposed along a lower edge of the discharge port 45 and the two roller bodies 53b are disposed so as to come into contact with the two roller bodies 51b of the drive roller 51 obliquely from the front lower side at a predetermined pressure. As a result, a discharge nip N2 formed between the roller bodies 51b of the drive roller 51 and the roller bodies 53b of the driven roller 53 is inclined in an oblique upper direction toward the downstream side in the sheet discharge direction. Both end portions of the third rotational shaft 53a are supported by the lower frame 43 in a rotatable manner. The driven roller 53 is driven by the drive roller 51 to be rotated in a counter direction of the rotation direction of the drive roller 51.

When the drive roller 51 is rotated in one direction (the clockwise direction in FIG. 2), the sheet is discharged through the discharge port 45 from the common path 21 into a space above the discharge tray 15. After that, when the drive roller 51 is rotated in the other direction (the counterclockwise direction in FIG. 2), the sheet is switched back from the space above the discharge tray 15 through the discharge port 45 to the common path 21. As shown in FIG. 2, of the common path 21, a lower path 21A from the one-side side nip N1 between the intermediate roller 23 and the one-side side conveyance roller 27 to the discharge nip N2 of the discharge rollers pair 33 is inclined upward. On the other hand, of the common path 21, an upper path 21B from the discharge nip N2 of the discharge rollers pair 33 to the double-side side nip N3 between the intermediate roller 23 and the double-side side conveyance roller 29 is almost horizontal.

Figure 4:
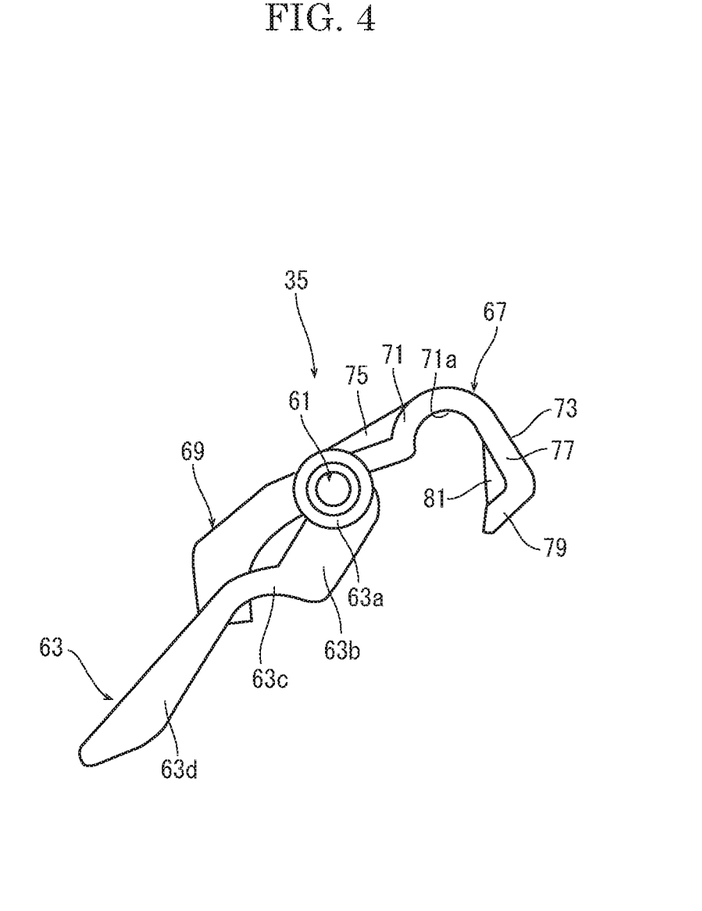
FIG. 4 is a side view showing a sheet pressing member, in the color printer according to an embodiment of the present disclosure.

Next, the sheet pressing member 35 will be described with reference to FIG. 3 and FIG. 4. FIG. 4 is a side view showing the sheet pressing member when viewed from the front side of the color printer 1. The sheet pressing member 35 includes a first rotational shaft 61, a detection piece 63 and a corrugation piece 67 and a light shielding piece (a detected piece) 69 which are fixed to the first rotational shaft 61. The first rotational shaft 61, the detection piece 63, the corrugation piece 67 and the light shielding piece 69 are formed integrally. However, the detection piece 63, the corrugation piece 67 and the light shielding piece 69 may be formed separately from the first rotational shaft 61, and they may be attached to the first rotational shaft 61.

The detection piece 63 contains a center detection piece 63A and a pair of end detection pieces 63B. The center detection piece 63A protrudes from a center portion of the first rotational shaft 61 in a radial direction of the first rotational shaft 61. The end detection pieces 63B protrude from end portions of the first rotational shaft 61 in the same radial direction as the center detection piece 63A. The detection piece 63 is formed in a longitudinally long plate shape, and has a fixed portion 63a, a base portion 63b, a bent portion 63c and a contact portion 63d in the order from the first rotational shaft 61, as shown in FIG. 4. The fixed portion 63a is fixed to the first rotational shaft 61. The base portion 63b protrudes from the fixed portion 63a in the radial direction of the first rotational shaft 61. The bent portion 63c is bent from the base portion 63b in a direction crossing to the radial direction. The contact portion 63d protrudes from the bent portion 63c almost parallel to the base portion 63b. The end detection piece 63B has a width wider than that of the center detection piece 63A.

The corrugation piece 67 protrudes from the fixed portion 63a of the center detection piece 63A in an almost opposite direction to the protruding direction of the center detection piece 63A with respect to the first rotational shaft 61. The corrugation piece 67 has a base part 71 and a tip part 73 in the order from the fixed portion 63a. The base part 71 protrudes from the fixed portion 63a in the radial direction of the first rotational shaft 61. The tip part 73 is bent from a tip end portion of the base part 71 in a direction crossing to the radial direction. A tip side portion of the base part 71 is formed into a semicircular curved portion 71a when viewed from in the axial direction of the first rotational shaft 61. The curved portion 71a is curved in a semicircular shape toward the upstream side in the rotational direction (the clockwise direction in FIG. 4) of the sheet pressing member 35 when the detection piece 63 is pushed up. On an outer face of the base part 71, a rib 75 is formed along the longitudinal direction of the base part 71 (the radial direction of the first rotation shaft 61). The tip part 73 has an extended portion 77 and a pressing portion 79 which are crossed each other at almost right angles. The extended portion 77 extends from a tip end of the base part 71 to the downstream side in the rotational direction (the clockwise direction in FIG. 4) of the sheet pressing member 35 when the detection piece 63 is pushed up. The pressing portion 79 is bent from a tip end of the extended portion 77 in a direction close to the first rotational shaft 61. On an inner face of the tip part 73, a rib 81 is formed along the longitudinal direction of the tip part 73.

The light shielding piece 69 protrudes from one end portion of the first rotational shaft 61 (the end portion outside the pair of end detection pieces 63B) in almost the same radial direction of the protruding direction of the detection piece 63.

As shown in FIG. 2 and FIG. 3, the sheet pressing member 35 is arranged above the discharge rollers pair 33 and closer to the discharge port 45 than the discharge rollers pair 33 with the detection piece 63 and the light shielding piece 69 at the side of the discharge tray 15 and the corrugation piece 67 at the side on the inside of the apparatus main body 3. Both the end portions of the first rotational shaft 61 are supported by the upper frame 41 in a rotatable manner. At this time, as shown in FIG. 3, the center detection piece 63A and the corrugation piece 67 are arranged between the two roller bodies 51b of the drive roller 51 and between the two roller bodies 53b of the driven roller 53 of the discharge rollers pair 33.

As shown in FIG. 2, the sheet pressing member 35 is turned such that the detection piece 63 and the light shielding piece 69 are suspended in the oblique lower direction by their own weight above the discharge tray 15 across the discharge port 45 while the corrugation piece 67 is lifted in the oblique upper direction. The posture of the sheet pressing member 35 is called an initial posture. At the initial posture, the sheet discharged through the discharge port 45 by the discharge rollers pair 33 comes into contact with the detection piece 63. And, when an amount of the sheets stacked on the discharge tray 15 is increased, the detection piece 63 comes into contact with the uppermost sheet of the sacked sheets and then pushed up gradually. Then, when the height of the stacked sheet becomes a predetermined height, a full stack of the sheet is detected (described later in detail).

The upper limit detection sensor 37 is a light sensor having a light emitting part and a light receiving part facing each other via a predetermined gap. When a light path between the light emitting part and the light receiving part is blocked or opened, an ON state and an Off state are switched. The upper limit detection sensor 37 is attached to the upper frame 41 so as to be positioned such that the light shielding piece 69 blocks the optical path when the detection piece 63 is pushed up to a predetermined height by the uppermost sheet of the stacked sheets on the discharge tray 15.

A sheet discharging operation of the color printer 1 having the above described configuration will be described with reference to FIGS. 5A, 5B, 5C and 6. FIGS. 5A, 5B, 5C and 6 are side views showing the sheet pressing member. In the following description, a leading edge of the sheet S in the sheet discharge direction is called a first edge E1 and a tail edge of the sheet S in the sheet discharge direction is called a second edge E2. That is, when the sheet S is switched back in the opposite direction to the discharge direction, the lead edge of the sheet S is changed in the second edge E2 and the tail edge of the sheet S is changed in the first edge E1.

Figure 5A:
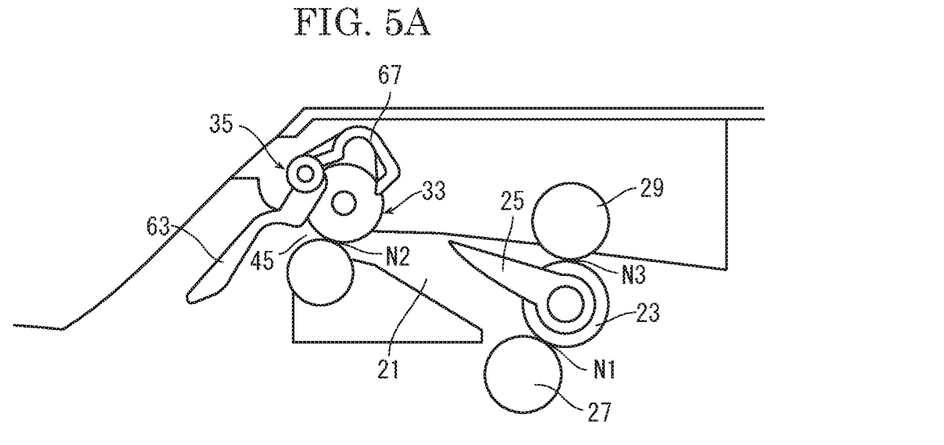
FIG. 5A is a side view showing the sheet pressing member at an initial posture, in the color printer according to the embodiment of the present disclosure.
Figure 5B:
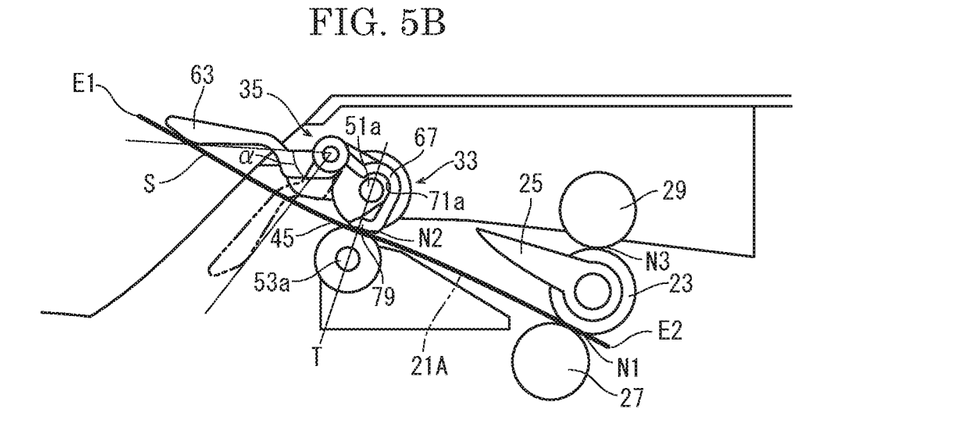
FIG. 5B is a side view showing the sheet pressing member at a sheet discharging, in the color printer according to the embodiment of the present disclosure.

As shown in FIG. 5A, before the sheet is discharged, the sheet pressing member 35 stands still in the initial posture. At the one-side printing operation, when the sheet S is conveyed along the one-side printing path 17 and then passed through the fixing device 11, because the lower path 21A from the one-side side nip N1 to the discharge nip N2 is inclined upwardly as described above, the sheet S is conveyed in the upper oblique direction. Additionally, because the discharge nip N2 is inclined in the oblique upper direction toward the downstream side in the sheet discharge direction, the sheet S is discharged through the discharge port 45 from the discharge nip N2 in a first direction along the oblique upper direction at a predetermined discharge angle. Then, the first edge E1 of the sheet S comes into contact with the detection piece 63 of the sheet pressing member 35, and the detection piece 63 is pushed up and the sheet pressing member 35 is turned in the clockwise direction in FIG. 5A. Then, as shown in FIG. 5B, the detection piece 63 is displaced into a first posture turned upwardly by a first angle α with respect to the initial posture.

On the other hand, the corrugation piece 67 is turned downwardly with resect to the initial posture to be displaced into a contact posture. In the contact posture, the corrugation piece 67 comes into contact with an upper face of the sheet S between the two roller bodies 51b of the drive roller 51 and between the two roller bodies 53b of the driven roller 53 of the discharge rollers pair 33, and then pushes the sheet S downward. In detail, an outer face (a pressing face) of the pressing portion 79 of the tip part 73 of the corrugation piece 67 comes into contact with the sheet S. At this time, when viewed from the axial direction of the first rotational shaft 61, the pressing portion 79 comes into contact with the sheet S below the discharge nip N2 on a line T passing through the centers of the second rotational shaft 51a of the drive roller 51 and the third rotational shaft 53a of the driven roller 53 of the discharge rollers pair 33. That is, the sheet S is put between the two roller bodies 51b of the drive roller 51 and the two roller bodies 53b of the driven roller 53 of the discharge rollers pair 33, and the center portion of the sheet S is pushed downwardly so that the center portion of the sheet S is curved downwardly to be applied with stiffness. When the sheet pressing member 35 is turned in the above manner, the second rotational shaft 51a of the drive roller 51 of the discharge rollers pair 33 enters the curved portion 71a of the base part 71 of the corrugation piece 67 so that the second rotational shaft 51a of the drive roller 51 does not interfere with the turning of the corrugation piece 67.

Because the center portion of the sheet S is pushed downwardly by the corrugation piece 67, the sheet S is discharged through the discharge port 45 while being curved and then stacked on the discharge tray 15. After the second edge E2 of the sheet S is passed through the discharge rollers pair 33, the sheet pressing member 35 is turned into the initial posture (refer to FIG. 5A) by its own weight.

Figure 5C:
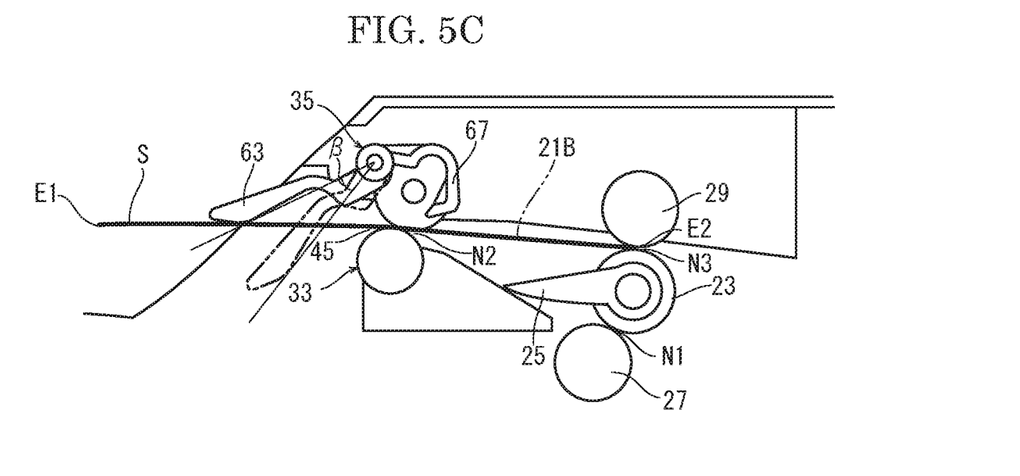
FIG. 5C is a side view showing the sheet pressing member at a turning back of the sheet, in the color printer according to the embodiment of the present disclosure.

On the other hand, when the sheet S is conveyed in the sheet discharge direction at the double-side printing operation, until the second edge E2 of the sheet S is passed through the one-side side nip N1, the corrugation piece 67 comes into contact with the sheet S in the same manner as the one-side printing operation. However, during a period where the second edge E2 of the sheet S is passed through the one-side side nip N1 and is passing through the common path 21, the sheet S is put between the discharge rollers pair 33 only. Then, after the sheet S is discharged through the discharge port 45 for a predetermined length, the discharge rollers pair 33 is inverted. The sheet S is switched back and then conveyed in an almost horizontal second direction at a predetermined inversion angle until the second edge E2 of the sheet S is conveyed through the upper path 21B and caught by the double-side side nip N3. Because the inversion angle with respect to the horizontal direction is smaller than the discharge angle with respect to the horizontal direction, the sheet pressing member 35 is turned in the counter clockwise direction in FIG. 5B by its own weight. Then, as shown in FIG. 5C, the detection piece 63 is turned into a second posture turned upward with respect to the initial posture by a second angle β smaller than the first angle α. On the other hand, the corrugation piece 67 is displaced into a retracting posture turned downward with respect to the initial posture. In the retracting posture, the corrugation piece 67 is separated from the sheet S upwardly. That is, when the sheet is switched back, the sheet S is not applied with stiffness. When the switched back sheet S is separated from the detection piece 63, the sheet pressing member 35 is turned into the initial posture (refer to FIG. 5A) and then stands still.

Figure 6:
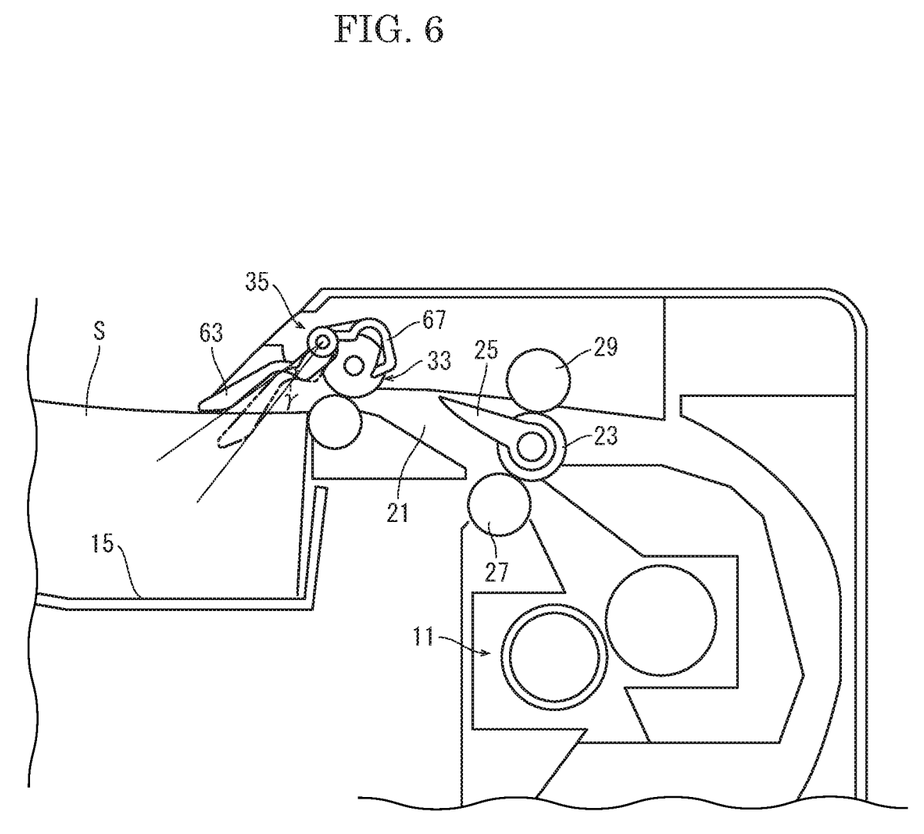
FIG. 6 is a side view showing the sheet pressing member at a sheet fully stacked state, in the color printer according to the embodiment of the present disclosure.

When an amount of the sheets stacked on the discharge tray 15 is increased, the detection piece 63 is pushed up by the uppermost sheet gradually to turn the sheet pressing member 35 gradually. Then, as shown in FIG. 6, when the uppermost sheet S reaches a predetermine height and the discharge tray 15 is filled with the sheets, the light shielding piece 69 blocks the optical path of the upper limit detection sensor 37 and the ON state continues for a predetermined period. Then, it is detected that the discharge tray 15 is filled with the sheets. The angles α and β of the detection piece 63 when the detection piece 63 is pushed up by the discharged sheet and the switched back sheet are larger than an angle γ of the detection piece 63 when the detection piece 63 is pushed by the fully stacked sheets.

As described above, according to the color printer 1 of the present disclosure, when the sheet S is discharged, the corrugation piece 67 comes into contact with the sheet S to apply stiffness to the sheet S while when the sheet S is switched back, the corrugation piece 67 does not come into contact with the sheet S and apply the corrugation on the sheet S. Accordingly, it becomes possible to prevent the occurrence of abnormal sound when the sheet S is switched back and to apply the corrugation on the sheet S when the sheet S is discharged.

Additionally, by a difference of the turning angles of the detection piece 63 owing to a difference of the sheet discharge angles when the sheet is switched back and when the sheet is discharged, it is determined whether the corrugation piece comes into contact with the sheet S or not. Then, a member to operate the corrugation piece 67 individually is not required so that it becomes possible to make the structure of the sheet discharge device 13 simple.

Additionally, the center portion of the sheet S put between the discharge rollers pair 33 is pushed downward along the line T passing through the centers of the second rotational shaft 51a of the drive roller 51 and the third rotational shaft 53a of the driven roller 53 of the discharge rollers pair 33. Accordingly, it becomes possible to apply stiffness on the sheet S effectively.

Additionally, the tangent line passing through the discharge nip N2 of the discharge rollers pair 33 is inclined upwardly in the sheet discharge direction, and the sheet S is discharged from the discharge nip N in the oblique upper direction. Accordingly, when discharged, the sheet S easily comes into contact with the detection piece 63 of the sheet pressing member 35 so that it becomes possible to turn the sheet pressing member 35 surely.

In the present embodiment, the corrugation piece 67 is provided integrally with the center detection piece 63A; however, the corrugation piece 67 may be directly fixed to the first rotational shaft 61 separately from the center detection piece 63A.

Figure 7:
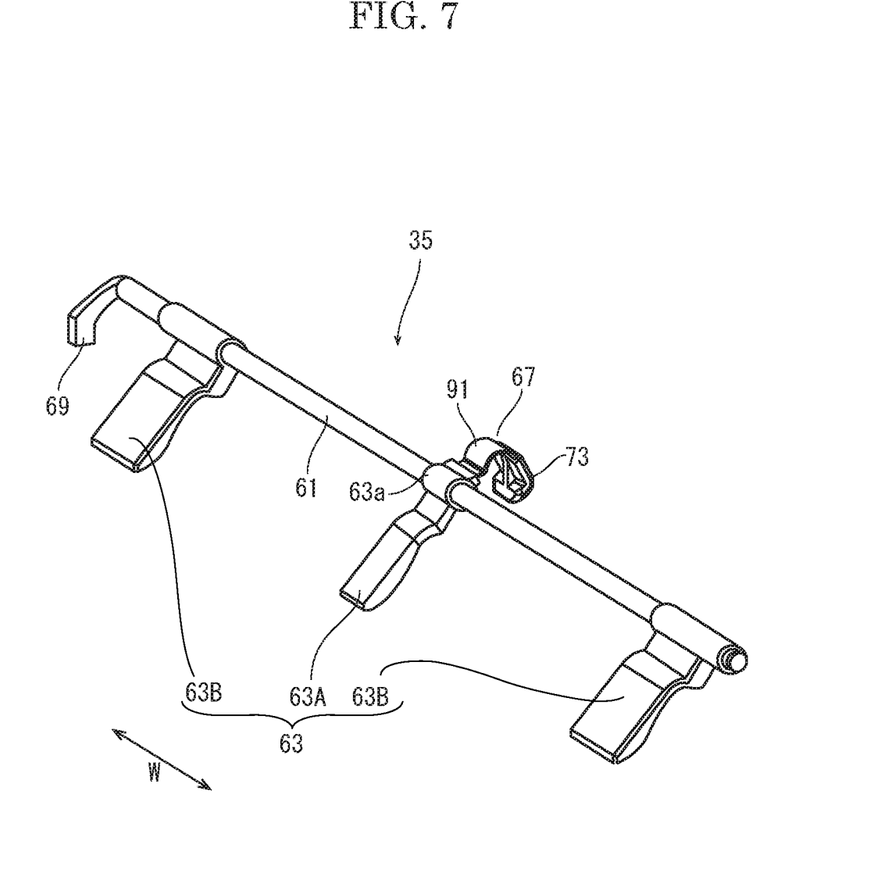
FIG. 7 is a perspective view showing the sheet pressing member of a first modified example, in the color printer according to the embodiment of the present disclosure.

Next, with reference to FIG. 7, a first modified example of the sheet pressing member of the present embodiment will be described. FIG. 7 is a perspective view showing the first modified example of the sheet pressing member.

In the first modified example, the tip part 73 of the corrugation piece 67 of the sheet pressing member 35 is connected to the fixed portion 63a of the center detection piece 63A by a plate spring 91 as an elastic member. The plate spring 91 is curved in a semicircular shape toward the upstream side in the rotational direction (the clockwise direction in FIG. 7) of the sheet pressing member 35 when the detection piece 63 is pushed up.

By providing the plate spring 91, when the pressing portion 79 of the tip part 73 of the corrugation piece 68 comes into contact with the sheet S at the sheet discharging, the corrugation piece 67 is elastically deformed in an opposite direction to the contact direction (the clockwise direction in FIG. 7). Accordingly, if the sheet has high stiffness, it becomes possible to prevent applying corrugation to the sheet excessively.

Figure 8:
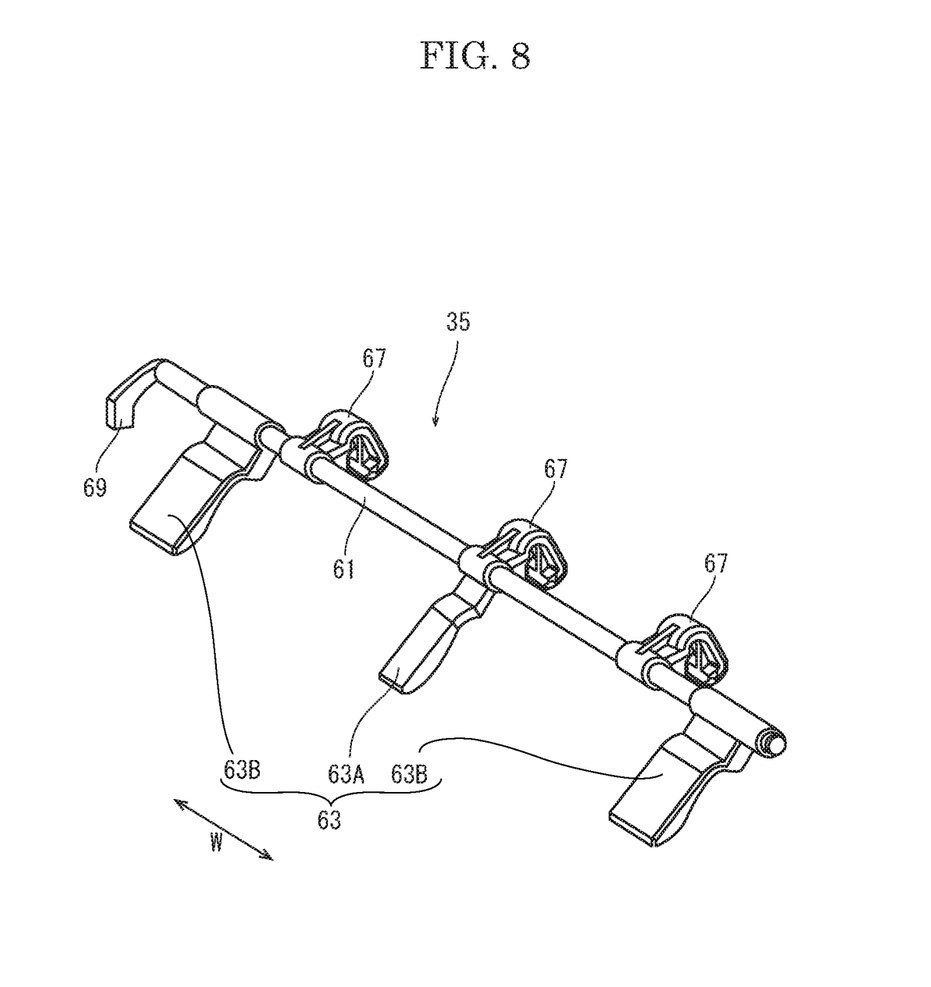
FIG. 8 is a perspective view showing the sheet pressing member of a second modified example, in the color printer according to the embodiment of the present disclosure.

Next, with reference to FIG. 8, a second modified example of the sheet pressing member of the present embodiment will be described. FIG. 8 is a perspective view showing the second modified example of the sheet pressing member.

In the second modified example, the sheet pressing member 35 includes three of the corrugation pieces 67. The center corrugation piece 67 is provided integrally with the center detection piece 63A. Both the two end corrugation pieces 67 are directly fixed to the first rotational shaft 61 inside the end detection pieces 63B.

By providing the plurality of corrugation pieces 67, the portions to be applied with stiffness are distributed in the sheet width direction W so that the sheet S is corrugated to be stiffened.

Although the present disclosure described the specific embodiment, the present disclosure is not limited to the embodiment. It is to be noted that one skilled in the art can modify the embodiment without departing from the scope and spirit of the present disclosure.

The invention claimed is:

1. An image forming apparatus comprising:
a discharge rollers pair configured to discharge and switch back a sheet at a discharge port;
a sheet pressing member configured to press an upper face of the sheet discharged by the discharge rollers pair; and
a discharge tray on which the sheet discharged through the discharge port is stacked,
wherein the sheet pressing member includes:
a first rotational shaft supported above the discharge port along a width direction perpendicular to a discharge direction;
a detection piece protruding in a radial direction from the first rotational shaft and supported in an initial posture where the detection piece protrudes toward the discharge tray across the discharge port, the detection piece being turnable into a first posture where the detection piece is pushed up by the sheet discharged at a predetermined discharge angle and then turned at a first angle with respect to the initial state and into a second posture where the detection piece is pushed up by the sheet switched back at a predetermined inversion angle and then turned at a second angle different from the first angle with respect to the initial state; and
a corrugation piece protruding in a radial direction different from a protruding direction of the detection piece from the first rotational shaft, rotatable together with the detection piece and configured to come into contact with the discharged sheet from an upper side to apply stiffness to the sheet,
wherein when the detection piece is turned at the first posture, the corrugation piece is changed into a contact posture where the corrugation piece comes into contact with the sheet to apply stiffness on the sheet, and
when the detection piece is turned at the second posture, the corrugation piece is changed into a retracting posture where the corrugation piece separates from the sheet.

2. The image forming apparatus according to claim 1, wherein the discharge angle of the sheet with respect to a horizontal direction is larger than the inversion angle of the sheet with respect to the horizontal direction, and the first angle is larger than the second angle.

3. The image forming apparatus according to claim 1, wherein the discharge rollers pair includes a plurality of roller bodies pairs supported via predetermined intervals along the sheet width direction each other, and the corrugation piece is arranged between the adjacent roller bodies pairs in the width direction.

4. The image forming apparatus according to claim 1, wherein the corrugation piece has:
a base part protruding in an opposite direction to a protruding direction of the detection piece;
an extended part bent from a tip end of the base part; and
a pressing part bent from a tip end of the extended part at almost right angles in a direction closer to the first rotational shaft,
wherein the pressing part comes into contact with the sheet when the corrugation piece is changed into the contact posture.

5. The image forming apparatus according to claim 4, wherein the pressing part is arranged on a line passing through centers of rotational shafts of each of the discharge rollers pairs when the corrugation piece is changed into the contact posture.

6. The image forming apparatus according to claim 4, wherein the base part of the corrugation piece has an elastic property, and is elastically deformable when the corrugation piece is in the contact posture.

7. The image forming apparatus according to claim 1, wherein a tangent line passing a nip of the discharge rollers pair is inclined upward toward the discharge direction.

8. The image forming apparatus according to claim 1, comprising:
a detected piece protruding in a radial direction from the first rotational shaft of the sheet pressing member; and
an optical sensor configured to detect whether an optical path is blocked or not by the detected piece,
wherein when the detection piece is pushed up by the sheet fully stacked on the discharge tray and then the sheet pressing member is turned, the detected piece blocks the optical path to detect that the discharge tray is filled with the sheets.

9. The image forming apparatus according to claim 1, wherein the corrugation piece includes a plurality of corrugation pieces provided at predetermined intervals along the width direction.

10. The image forming apparatus according to claim 1, wherein the corrugation piece is formed integrally with the sheet pressing member.

* * * * *